United States Patent
Wallace et al.

(10) Patent No.: US 10,218,026 B2
(45) Date of Patent: Feb. 26, 2019

(54) FLEXIBLE FUEL CELL POWER SYSTEM

(71) Applicant: Intelligent Energy Limited, Loughborough (GB)

(72) Inventors: Andrew Wallace, Davis, CA (US); Glenn Rambach, Cameron Park, CA (US); Linna Peng, Davis, CA (US); Rodney Sparks, Antelope, CA (US); John Melack, Winters, CA (US)

(73) Assignee: Intelligent Energy Limited, Loughborough (GB)

( * ) Notice: Subject to any disclaimer, the term of this patent is extended or adjusted under 35 U.S.C. 154(b) by 0 days.

(21) Appl. No.: 15/266,866

(22) Filed: Sep. 15, 2016

(65) Prior Publication Data

US 2017/0054175 A1    Feb. 23, 2017

Related U.S. Application Data

(63) Continuation of application No. PCT/US2015/021324, filed on Mar. 18, 2015.

(Continued)

(51) Int. Cl.

| | |
|---|---|
| *H01M 8/241* | (2016.01) |
| *H01M 8/2418* | (2016.01) |
| *H01M 8/065* | (2016.01) |
| *H01M 8/249* | (2016.01) |
| *H01M 8/2484* | (2016.01) |
| *H01M 8/2465* | (2016.01) |

(Continued)

(52) U.S. Cl.
CPC ..... *H01M 8/2418* (2016.02); *H01M 8/04208* (2013.01); *H01M 8/065* (2013.01); *H01M 8/241* (2013.01); *H01M 8/249* (2013.01); *H01M 8/2465* (2013.01); *H01M 8/2484* (2016.02); *H01M 2008/1095* (2013.01); *H01M 2250/10* (2013.01); *H01M 2250/30* (2013.01); *Y02B 90/14* (2013.01); *Y02B 90/18* (2013.01)

(58) Field of Classification Search
None
See application file for complete search history.

(56) References Cited

U.S. PATENT DOCUMENTS

| | | |
|---|---|---|
| 7,211,539 B2 | 5/2007 | Lefenfeld et al. |
| 7,259,128 B2 | 8/2007 | Lefenfeld et al. |

(Continued)

FOREIGN PATENT DOCUMENTS

| | | |
|---|---|---|
| WO | WO 2014/013246 A2 | 1/2014 |
| WO | WO 2016/059370 A1 | 4/2016 |

OTHER PUBLICATIONS

International Patent Application No. PCT/US2015/021324; Int'l Search Report and the Written Opinion; dated May 29, 2015; 15 pages.

(Continued)

*Primary Examiner* — Wyatt P McConnell
(74) *Attorney, Agent, or Firm* — Baker & Hostetler LLP; Mark H. Krietzman

(57) ABSTRACT

A flexible fuel cell power system comprising one or more fuel cell cartridges (which contain fuel cell modules) connected to a fuel cell system is provided. The components of the flexible fuel cell power system may be placed on a shared backbone with flexible joints, and may be made of flexible materials so that the entire system can be worn by a human being.

20 Claims, 8 Drawing Sheets

Related U.S. Application Data

(60) Provisional application No. 61/955,351, filed on Mar. 19, 2014.

(51) Int. Cl.
  *H01M 8/04082* (2016.01)
  *H01M 8/1018* (2016.01)

(56) References Cited

U.S. PATENT DOCUMENTS

| | | | |
|---|---|---|---|
| 7,271,567 | B2 | 9/2007 | Dunn et al. |
| 7,316,788 | B2 | 1/2008 | Autrey et al. |
| 7,578,992 | B2 | 8/2009 | Mohajeri et al. |
| 7,682,411 | B2 | 3/2010 | Jones et al. |
| 2006/0030652 | A1* | 2/2006 | Adams ............ H01M 8/04201 524/210 |
| 2006/0257707 | A1* | 11/2006 | Kaschmitter ..... H01M 8/04216 429/412 |
| 2007/0072042 | A1 | 3/2007 | Lam et al. |
| 2007/0228740 | A1 | 10/2007 | Suso |
| 2007/0279852 | A1* | 12/2007 | Daniel ................ A44C 5/0007 361/679.03 |
| 2008/0044707 | A1 | 2/2008 | Chou et al. |
| 2008/0277441 | A1 | 11/2008 | Zimmermann et al. |
| 2010/0247426 | A1 | 9/2010 | Wallace et al. |
| 2011/0194992 | A1* | 8/2011 | Barton ...................... B01J 7/02 422/239 |
| 2012/0115054 | A1 | 5/2012 | Wallace et al. |
| 2013/0251626 | A1 | 9/2013 | Wallace et al. |

OTHER PUBLICATIONS

International Patent Application No. PCT/US2015/021324; Int'l Preliminary Report on Patentability; dated Sep. 29, 2016; 9 pages.
European Patent Application No. 15765770.1; Extended Search Report dated Jul. 12, 2017; 9 pages.
Singapore Patent Application No. 11201607644P; Written Opinion; dated Sep. 5, 2017; 7 pages.
Singapore Patent Application No. 11201607644P; Written Opinion; dated Jul. 13, 2018; 7 pages.

* cited by examiner

FLEXIBLE FUEL CELL POWER SYSTEM

CROSS-REFERENCE TO RELATED APPLICATIONS

This patent application is a Continuation of international patent application PCT/US2015/021324 filed Mar. 18, 2015, which claims priority to Provisional patent application 61/955,351 filed Mar. 19, 2014, the disclosures of which are incorporated by reference in their entirety.

FIELD OF THE DISCLOSURE

This disclosure relates to a flexible fuel cell power system that can be configured to a variety of uses.

BACKGROUND

Fuel cells are electrochemical energy conversion devices that convert an external source fuel into electrical current. Many fuel cells use hydrogen as the fuel and oxygen (typically from air) as an oxidant. The by-product for such a fuel cell is water, making the fuel cell a very low environmental impact device for generating power.

Fuel cells compete with numerous other technologies for producing power, such as the gasoline turbine, the internal combustion engine, and the battery. A fuel cell provides a direct current (DC) voltage that can be used for numerous applications including stationary power generation, lighting, back-up power, consumer electronics, personal mobility devices, such as electric bicycles, as well as landscaping equipment, and other applications. There are a wide variety of fuel cells available, each using a different chemistry to generate power. Fuel cells are usually classified according to their operating temperature and the type of electrolyte system that they utilize. One common fuel cell is the polymer exchange membrane fuel cell (PEMFC), which uses hydrogen as the fuel with oxygen (usually air) as its oxidant. It has a high power density and a low operating temperature of usually below 80° C. These fuel cells are reliable with modest packaging and system implementation requirements.

The challenge of hydrogen storage and generation has limited the wide-scale adoption of PEM fuel cells. Although molecular hydrogen has a very high energy density on a mass basis, as a gas at ambient conditions it has very low energy density by volume. The techniques employed to provide hydrogen to portable applications are widespread, including high pressure and cryogenics, but they have most often focused on chemical compounds that reliably release hydrogen gas on-demand. Three broadly accepted mechanisms used to store hydrogen in materials are absorption, adsorption, and chemical reaction.

In absorptive hydrogen storage for fueling a fuel cell, hydrogen gas is absorbed directly at high pressure into the bulk of a specific crystalline material, such as a metal hydride. Metal hydrides such as $MgH_2$, $NaAlH_4$, and $LaNi_5H_6$, can be used to store the hydrogen gas reversibly. However, metal hydride systems often suffer from poor specific energy (i.e., a low hydrogen storage to metal hydride mass ratio) and poor input/output flow characteristics. The hydrogen flow characteristics are driven by the endothermic properties of metal hydrides (the internal temperature drops when removing hydrogen and rises when recharging with hydrogen). Because of these properties, metal hydrides tend to be heavy and require complicated systems to rapidly charge and/or discharge them. For example, see U.S. Pat. No. 7,271,567 for a system designed to store and then controllably release pressurized hydrogen gas from a cartridge containing a metal hydride or some other hydrogen-based chemical fuel. This system also monitors the level of remaining hydrogen capable of being delivered to the fuel cell by measuring the temperature and/or the pressure of the metal hydride fuel itself and/or by measuring the current output of the fuel cell to estimate the amount of hydrogen consumed.

In adsorption hydrogen storage for fueling a fuel cell, molecular hydrogen is associated with the chemical fuel by either physisorption or chemisorption. Chemical hydrides, such as lithium hydride (LiH), lithium aluminum hydride ($LiAlH_4$), lithium borohydride ($LiBH_4$), sodium hydride (NaH), sodium borohydride ($NaBH_4$ or "SBH"), and the like, are used to store hydrogen gas non-reversibly. Chemical hydrides produce large amounts of hydrogen gas upon reaction with water as shown below:

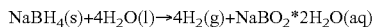

$NaBH_4(s)+4H_2O(l) \rightarrow 4H_2(g)+NaBO_2*2H_2O(aq)$

To reliably control the reaction of chemical hydrides with water to release hydrogen gas from a fuel storage device, a catalyst must be employed along with control of the water's pH. Additionally, the chemical hydride is often embodied in a slurry of inert stabilizing liquid to protect the hydride from early release of its hydrogen gas.

In chemical reaction methods for producing hydrogen for a fuel cell, often hydrogen storage and hydrogen release are catalyzed by a modest change in temperature or pressure of the chemical fuel. One example of this chemical system, which is catalyzed by temperature, is hydrogen generation from ammonia-borane by the following reaction:

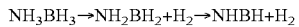

$NH_3BH_3 \rightarrow NH_2BH_2+H_2 \rightarrow NHBH+H_2$

The first reaction releases 6.1 wt. % hydrogen and occurs at approximately 120° C., while the second reaction releases another 6.5 wt. % hydrogen and occurs at approximately 160° C. These chemical reaction methods do not use water as an initiator to produce hydrogen gas, do not require a tight control of the system pH, and often do not require a separate catalyst material. However, these chemical reaction methods are plagued with system control issues often due to the common occurrence of thermal runaway. Such a heat driven system depending on decomposition of the material may also not extract all available hydrogen completely and cleanly, and usable hydrogen is often still bonded to the byproduct and wasted in the reaction. See, for example, U.S. Pat. No. 7,682,411, for a system designed to thermally initialize hydrogen generation from ammonia-borane and to protect from thermal runaway. See, for example, U.S. Pat. Nos. 7,316,788 and 7,578,992, for chemical reaction methods that employ a catalyst and a solvent to change the thermal hydrogen release conditions.

As the technology for fuel cell power systems improves, the applications and demand expand, which cannot be met by the existing state of the art. For example, modern combat soldiers need power systems that are lightweight, safe, flexible and easy to transport while meeting certain energy requirements. Other professions such as technicians and professionals also have a need for power systems that are lightweight, safe, flexible and easy to transport while meeting other energy requirements.

As such, there is a need for an improved fuel cell power system that is flexible, lightweight, safe, and easy to transport while meeting various energy requirements.

DISCLOSURE

The present disclosure provides aspects of flexible fuel cell power systems comprising a fuel cell cartridge and a fuel cell system. In exemplary implementations, the flexible fuel cell power systems comprise a fuel cell cartridge comprising a plurality of fuel cell modules, a fuel cell system, and a platform, wherein said fuel cell cartridge and said fuel cell system are attached to said platform, and wherein said platform includes bendable joints or flexures which permit said platform to be flexible.

The present disclosure provides shared balance of plant platforms for a flexible fuel cell power systems comprising a platform having bendable joints or flexures which permit said platform to be flexible, a fuel cell cartridge comprising a plurality of fuel cell modules, a fuel cell system comprising a fuel cell stack and a balance of plant, where the balance of plant comprises one or more hydrogen gas fluid lines, one or more water fluid lines, and one or more of a purge valve, a stack air blower, a system controller PCB assembly, a heat sink, a micropump, a fuel selector, a battery, and an output/comms connector, wherein said fuel cell cartridge and said fuel cell system are attached to said platform, wherein at least one of the hydrogen gas fluid lines and water fluid lines of the balance of plant are shared by the plurality of fuel cell modules, and wherein the modules are hot swappable.

DRAWINGS

The summary, as well as the following detailed description, is further understood when read in conjunction with the appended drawings. For the purpose of illustrating the disclosure, there are shown in the drawings exemplary implementations of the disclosure; however, the disclosure is not limited to the specific methods, compositions, and devices disclosed. In addition, the drawings are not necessarily drawn to scale. In the drawings.

Figure 1:
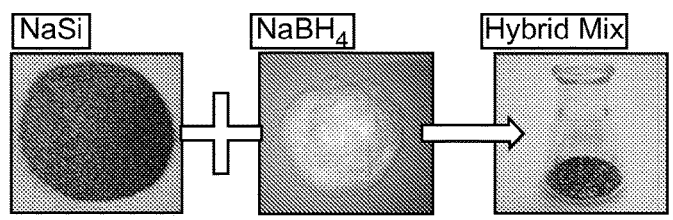
FIG. 1 illustrates aspects of a NaSi and $NaBH_4$ hybrid mix according to the present disclosure.

All reference numerals, designators, and call-outs in the figures and Appendix are hereby incorporated by this reference as fully set forth herein. The failure to number an element in a figure is not intended to waive any rights, and unnumbered references may also be identified by alpha characters in the figures and Appendix.

FURTHER DISCLOSURE

The present disclosure may be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular exemplars by way of example only and is not intended to be limiting of the claimed disclosure. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another exemplar includes from the one particular value and/or to the other particular value. Similarly, when values are expressed as approximations, by use of the antecedent "about," it will be understood that the particular value forms another exemplar. All ranges are inclusive and combinable.

It is to be appreciated that certain features of the disclosure which are, for clarity, described herein in the context of separate exemplar, may also be provided in combination in a single exemplary implementation. Conversely, various features of the disclosure that are, for brevity, described in the context of a single exemplary implementation, may also be provided separately or in any subcombination. Further, references to values stated in ranges include each and every value within that range.

In one aspect, the present disclosure provides flexible fuel cell power systems comprising a fuel cell cartridge and a fuel cell system. In exemplary implementations, the flexible fuel cell power systems comprise a fuel cell cartridge comprising a plurality of fuel cell modules, a fuel cell system, and a platform, wherein said fuel cell cartridge and said fuel cell system are attached to said platform, and wherein said platform includes bendable joints or flexures which permit said platform to be flexible.

In exemplary implementations, a plurality of fuel cell modules making up a fuel cell cartridge are connected to a fuel cell system. In such implementations, each of the individual fuel cell modules can be independently connected to a shared flexible backbone. Each of individual fuel cell cartridges may further be replaced on its own. The plurality of fuel cell modules may be arranged in an array.

In exemplary implementations the flexible fuel cell power systems can be formed by using bendable joints and/or soft material selection for the fuel cell cartridge and/or the fuel cell system. For example, the system can be constructed from an array of hydrolysis cartridges interlocked on a "chain" via flexures integrated from a shared back plane, thinly constructed spine, or any variation of the aforementioned. The flexures can be customized to provide sufficient and realistic degrees of bendability in between each cartridge without compromising structural integrity and/or pinching gas and water fluid paths. A shared water input/gas output line to the fuel cell modules integrated onto this shared element provides for detachment and refueling without interrupting power delivery. The array of modules can be configured to either be engaged in series or simultaneously depending on hydrogen generation demands of the fuel cell system. The system could also be partially or entirely constructed from malleable, elastomeric or very flexible material types, such as Mylar, which could inherently adhere to a wearer's body so that a person such as a soldier or technician can wear or carry the flexible fuel cell power system. The cartridge may consist of multiple flexible layers accomplishing different functions like chemical containment, water containment, or physical handling. Alternatively, the flexible fuel modules array could be formed by hinged or elastic joints connecting the modules directly to each other, irrespective of a backbone, with interconnection plumbing achieved via either discrete cables and/or hoses, or a highly-integrated plumbing and wiring assembly connected to each module in the array.

In exemplary implementations, the flexible fuel cell power systems of the present disclosure can be adjusted depending on what is needed. For example, for applications that require high structural support and rigidity (e.g., high pressure/impact resistance and/or high hydrogen pressure delivery into the fuel cell system), the entire hydrolysis reaction may be contained in hard housings. Individual thin planar modules may be attached to a common spine and can bend via flexures/flanges between each module.

In other exemplary implementations, the flexible fuel cell power systems can be designed for medical structural support and rigidity (e.g., structural support via limited inflexible pieces and basic rigidity via structures such as integrated beam supports or a skeleton). An example of such a system is a lightweight system comprising individually stacked fuel and water pouches that can hang from the shared water/gas line. Fueling can be performed via a puncturing motion. For passive water injection, this configuration can be initiated via integration of a simple inflexible lid that compresses the water bag for pressurization. Refueling would involve replacement of the pouches only. The lightweight material of the cartridge body also facilitates storage and transportation of multiple spares.

In further implementations, the flexible fuel cell power systems can be designed for low structural support and rigidity (e.g., low pressure input fuel cells). These configurations provide structural support via limited inflexible pieces and are almost entirely elastic and physically pliant. A bladder system may be used in some implementations. Volume exchange can be accomplished via a collapsible water bladder emptying out into a surrounding fuel bladder that is expanding into the same volume with byproduct formation and water input. All system configurations proposed herein are capable of integration with both active and passive controls for water injection. Similarly, optimization of all usable volume in the hydrogen cartridge can be achieved by active or passively driven water and waste byproduct volume exchange. Volume-exchange can also be achieved by passively utilizing a continuously collapsible water bladder as the aforementioned or via a dialed-in pressure differential in the system itself to compress the water compartment when the system calls for it In some instances, water is purged from the system sporadically to lower delivery pressure, and the fuel/waste compartment, at a higher pressure, expands into the newly available space at set intervals.

The Fuel Cell Cartridge

The purpose of the fuel cell cartridges is to produce or generate hydrogen, which will be delivered to the fuel cell system. Power is generated in the fuel cell systems using any fuel cell technology known in the art which uses hydrogen as the fuel.

The reactant fuel materials used in the present disclosure react quickly and cleanly with any water solution; the product of the hydrolysis reaction is high-purity, humidified hydrogen, which is the preferred fuel for a proton exchange membrane (PEM) fuel cell. No PEM catalyst poisons or stream diluents are formed from the reaction (such as CO and $CO_2$) that might be detrimental to fuel cell performance.

U.S. Patent Publication No. 2010/0247426, which is herein incorporated by reference in its entirety, describes useful fuel cell cartridges that may be used in the present disclosure. In exemplary implementations, the fuel cell cartridges comprise a reactor of various designs in which an aqueous solution is introduced to a reactant fuel material to generate hydrogen. The reactant fuel material may be a stabilized alkali metal material (e.g., sodium silicide, sodium-silica gel) and can include additional reactants such as sodium borohydride ($NaBH_4$ or "SBH"), and/or ammonia borane, and the like. Other conventional reactant fuel materials such as Group 1 metal/silica gel composition of U.S. Pat. No. 7,211,539 and the Group 1 metal/porous metal oxide composition of U.S. Pat. No. 7,259,128 (both of which are herein incorporated by reference in their entirety) and others known in the art can be used. The aqueous solution can be a part of the reactor or can be introduced by an external supply. An external control system can be used to control the hydrogen generation.

The performance of a fuel cell cartridge is based on how much hydrogen it can generate, which in turn is dependent in part on which reactant fuel material is used. As such, different reactant fuel material can be used depending on hydrogen production is necessary to meet the specified power demand/requirement.

Sodium silicide (NaSi) is created through the reaction of sodium metal with silicon powder and yields significantly more hydrogen per weight than pure sodium or stabilized alkali metals. NaSi's hydrogen generation capabilities are instantaneous and complete; it reacts instantaneously with any water solution to produce molecularly clean hydrogen gas on-demand. The reaction with water produces 2.5 moles of hydrogen per mole of NaSi according to the reaction:

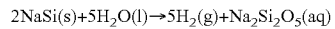

$$2NaSi(s) + 5H_2O(l) \rightarrow 5H_2(g) + Na_2Si_2O_5(aq)$$

NaSi is a useful source of hydrogen for fuel cells because it is low weight, produces hydrogen on-demand, is air and temperature stable. Since hydrogen is not generated until water is added, this material can be used, transported and stored safely, simply and indefinitely.

Sodium borohydride, $NaBH_4$ or "SBH", produces hydrogen according to the reaction:

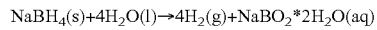

$$NaBH_4(s) + 4H_2O(l) \rightarrow 4H_2(g) + NaBO_2 \cdot 2H_2O(aq)$$

On a material's basis, $NaBH_4$ is energy dense with ~21 wt. % hydrogen. In practice, however, much lower yields are realized due to the need for large amount of catalysts or stabilizers and the clogging of the water ways. Note: "wt %" refers to weight percent, which is the percent of total material mass that consists of hydrogen, and is a measure of the hydrogen density of a material used as a hydrogen source.

Pure NaSi can produce 9.8 wt % hydrogen on a material's basis. Where power requirements are low, pure NaSi may be used.

Where power requirements are higher (i.e., hydrogen density above 9.8 wt %), a $NaSi/NaBH_4$ hybrid as shown in FIG. 1 can be used in a standard 50:50 wt % ratio to achieve up to 15.6 wt % hydrogen on a material's basis. An even a higher wt % $H_2$ can be produced if the hybrid composition is altered to include more $NaBH_4$. The $NaSi/NaBH_4$ hybrid is the standard composition of NaSi and $NaBH_4$:

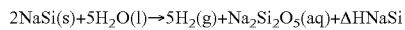

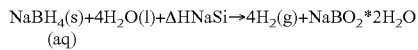
(aq)

The above equations are related to each other through the exothermic heat term. The NaSi hydrolysis reaction releases sufficient heat to both dissociate hydrogen bonds in the injected water and promote rapid hydrolysis of the $NaBH_4$. The heavily localized area where this heat exchange occurs on the surface of NaSi particles, thus providing a "hotter" environment that is ideal for $NaBH_4$ dehydrogenation reaction conditions. This coupled reaction scheme is thus able to induce complete hydrothermolysis of $NaBH_4$.

Figure 2:
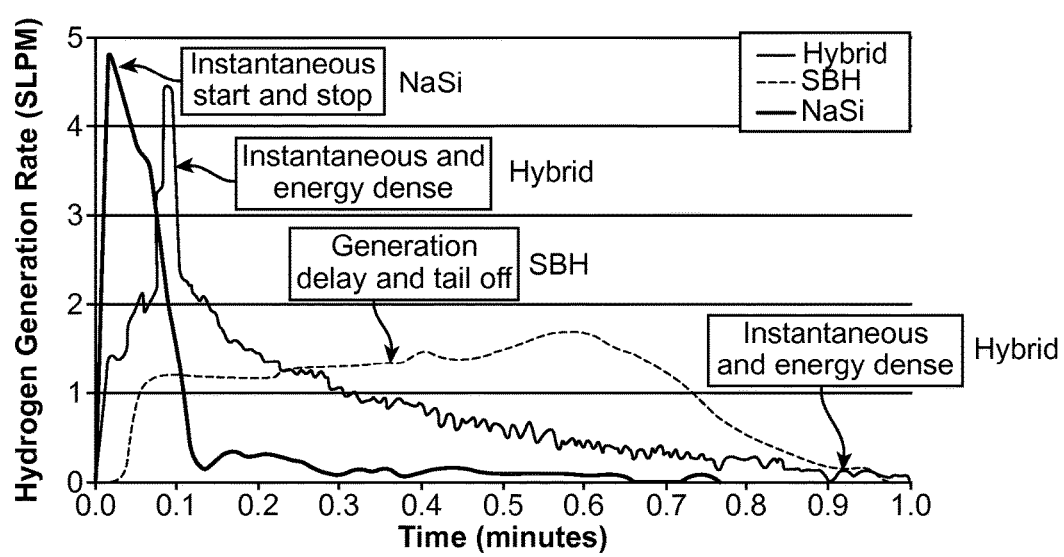
FIG. 2 is a chart comparing the hydrogen generation characteristics of NaSi, $NaBH_4$ ("SBH"), and NaSi/$NaBH_4$ hybrid mixture.

By combining the two materials, the best generation characteristics of each individual material is leveraged and high energy dense storage is achieved with instantaneous and self-sufficient hydrogen generation characteristics, as shown in FIG. 2. The hybrid also compensates for the shortcomings of each individual material by enhancing the hydride's reaction rate while increasing hydrogen density. Each material's unique generation characteristics are compared to that of the hybrid mix in FIG. 2. As illustrated, hydrogen generation with NaSi is near immediate, whereas $NaBH_4$ (also labeled as "SBH") is capable of liberating more hydrogen on a per weight basis. Combined, the $NaSi/NaBH_4$ hybrid is both quick to respond, self-regulated and longer sustained. Catalysts may be used in conjunction with the $NaSi/NaBH_4$ to promote and/or control the reaction.

Both chemicals individually liberate hydrogen via a hydrolysis reaction, but each sources the hydrogen differently. Whereas NaSi breaks and extracts hydrogen externally from the water, the hydrolysis of $NaBH_4$ breaks hydrogen bonds internal to the compound. However, both materials liberate hydrogen for use in a controlled manner solely proportional to the rate of water injection. The directness of such an exchange (water in=hydrogen out) simplifies the overall mechanical controls that are needed in a hydrogen-generation system.

Water-usage to powder-usage may be reduced using the hybrid chemistry to result in less volume required for water storage. For the same mass of powder, whether NaSi alone or a $NaSi/NaBH_4$ hybrid, both chemistries utilize approximately the same water by weight. However, using the hybrid has repeatedly demonstrated a realistic 5 wt % $H_2$ increase in generation.

The powder fuel can be stored in the fuel cartridge in multiple physical storage factors to best accommodate reaction kinetics, dynamic start/restart/stop responses, thermal management, or any other parameters necessary for prime operation towards a specific application or system. This may involve alternation of particle diameter or form factor of NaSi and/or $NaBH_4$, or further segregation of powdered fuel via mechanical dividers in each individual fuel compartment. The latter scenario may benefit a power system requiring a variable load and/or intermittent and rapid restarts. A power system providing continuous and steady power delivery will simplify powder design and a cartridge cell filled entirely with powder may be sufficient.

Figure 11:
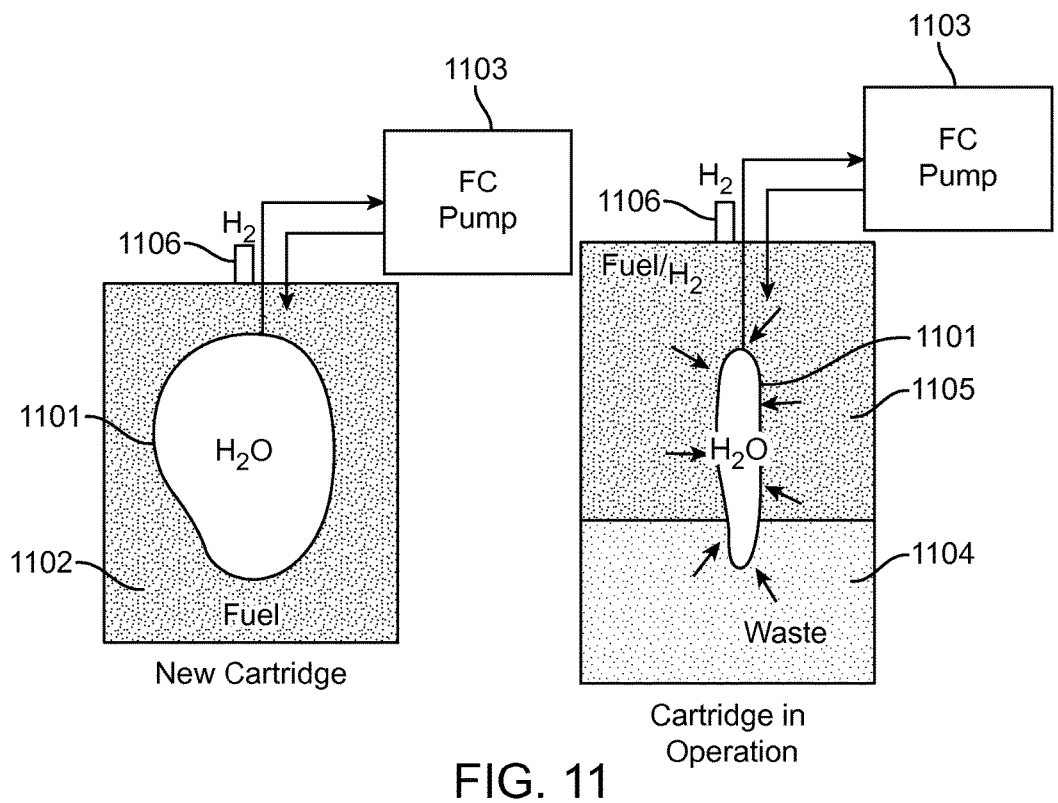
FIG. 11 illustrates aspects of the collapsible water and expandable fuel bags in a fuel cell power system in an exemplary implementation of the present disclosure.

Anti-freeze salt additives may be added to the water reservoir, allowing the use of the power system at below-freezing temperatures without compromising overall reactivity The water within each reactor may be placed within a water bladder, which will be surrounded by the reactant fuel. In this implementation, as the collapsible water bladder deflates with water depletion, the displaced water volume will be re-occupied by the newly-generated waste in the same allotted space. Aspects of this process are illustrated in FIG. 11, which shows a new cartridge on the left portion and a cartridge in operation on the right portion. A collapsible water bladder 1101 is initially present in a reactor surrounded by a volume of fuel with an internal water distribution network (not shown). During operation, water from the collapsible water bladder 1101 is pumped via the fuel cell pump 1103 out of the bladder and into the water distribution network that evenly deposits water into the fuel bed. As water reacts with the fuel, waste is generated and re-occupies the volume of the displaced water as the bladder shrinks. In operation, the reactor volume will contain regions of waste 1104 and regions of fuel/$H_2$. This flexibility will provide nearly unlimited form factor flexibility. Storage, transport and operation are simplified as the major internal components (i.e., the reactant fuel and water storage) can be highly shape and volume pliable. Low (i.e., less than 5 psi) on-demand flow generation can be generated. This low operating pressure is important to the development of a "soft" system instead of one which must be contained within a hardened shell.

Water can be either added to the fuel cartridge in the field (via a user-fillable water compartment) or can be preloaded in each cartridge at the factory. At the most basic level, the fuel cartridge may consist of a bed of hybrid fuel and a water distribution network that evenly deposits water into the fuel bed. The distribution network may consist of small punched orifices in a flexible tube. The water spreader configuration will be determined based on optimal reaction reach and spray, dependability, and the best balance between simplicity and functionality. In some exemplary implementations, fuel cell cartridges may be designed so that any water-reactive powder is within 0.7 inches of a water inlet point. All structures can be integrated with passive or active water controls with the option for water/waste exchange.

Figure 13:
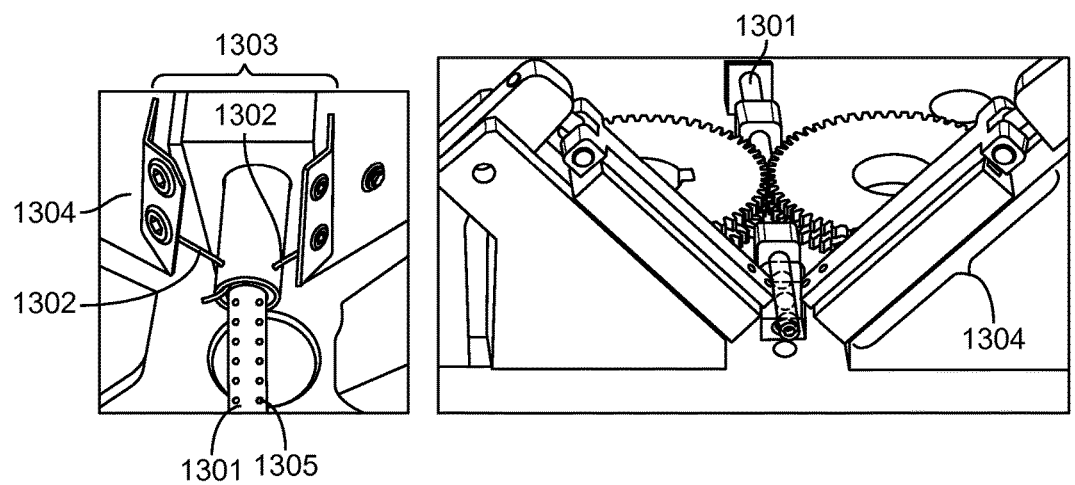
FIG. 13 illustrates aspects of a punching operation of a flexible tube system and an exemplary implementation of the same.

FIG. 13 illustrates aspects of a punching operation of a flexible tube system and an exemplary implementation of the same. The equipment takes a reel of tubing (not shown) and feeds the tubing strand 1301 into the control head 1303 containing the punch rods 1302 for processing. Control head 1303 contains punch mechanisms 1304 that drive the punch rods 1302 into the tubing strand to create small punched orifices 1305 in the tube. The finished, punched tubing is then re-wrapped onto another reel (not shown) for easy removal and storage.

In some implementations, the fuel cell or hydrogen cartridge can contain filtration elements to guarantee hydrogen purity upon delivery to the fuel cell or fuel cell system. Physical filtration may be necessary for retaining physical particulates, chemical foaming, and/or excessive moisture. Chemical filtration may be necessary for scrubbing reaction byproducts (both in liquid form carried by gas flow, or in gaseous form). A combination of the two will be incorporated into the cartridge at locations to maximize exposure and engagement of the outlet hydrogen gas. In this fashion, the most surface area would be available for filtration to occur. In high humidity cartridges where excess water cannot be resolved by the methods above, condensing and or drierite elements may be provided in the cartridge as well.

In one implementation, the fuel cell cartridge may generate 250 W-hr and is capable of hydrogen flow rates required for a 20 W load to end devices.

Fuel cell cartridges can be made from a variety of materials to achieve the desired flexibility and conformability. Fuel cell cartridges can also come in different shapes, thickness and sizes, and be treated with anti-corrosion substances such as silicate.

Figure 14:
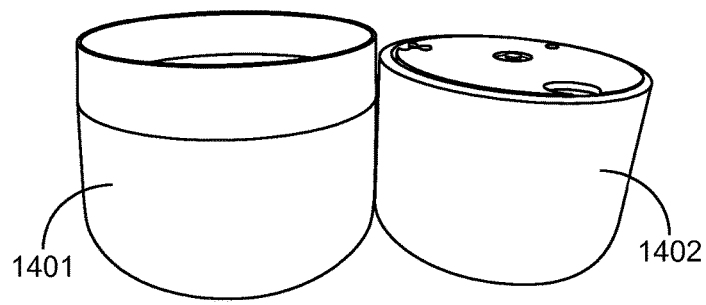
FIG. 14 illustrates aspects of canisters in an exemplary implementation of the present disclosure.

For example, FIG. 14 illustrates exemplary implementations of an aluminum canister 1401 and a silicate-treated canister 1402. Silicate-treated canisters can retain structural soundness even in the presence of corrosion due to optimal thickness. If aluminum canister thickness is too large, after silicate corrosion, canisters can crumble upon mechanical impact due to weakening aluminum thickness.

In some implementations, cartridges can be designed with an aluminum outer structure fuel cell cartridge of a thickness that will provide structure integrity up to 300 psi pressure and 100 kg load.

Fuel Cell System

The hydrogen generated from the fuel cell cartridge is delivered to the fuel cell system by any means known in the art. In the fuel cell system, the hydrogen reacts with oxygen to generate energy using any means known in the art.

U.S. Patent Publication No. 2012/0115054, which is herein incorporated by reference in its entirety, describes a portable water reactive hydrogen fuel cell power system comprising a fuel cell, a water feed tray system, and a fuel cartridge. In this system, water (or a liquid solution) is combined with a powder to generate hydrogen for a fuel cell system. These reaction types can use a range of powders such as sodium silicide, sodium silica gel, sodium borohydride, sodium silicide/sodium borohydride mixtures, aluminum, and others. Activators, catalysts, or additives can be added to the powder to control water dispersion through the powder or water absorption of the reaction by-products. Additives to the powder can also include defoamers, such as oils, as well as similar materials to distribute local reaction sites and/or temperatures to result in a more uniform reactivity and heat distribution in the fuel cartridge and to control reaction conditions, including, for example, the chemical and physical nature of the reaction products and byproducts. Powder size can be controlled to facilitate water transport, reaction rate, and byproduct water absorption. Activators, catalysts, or other additives can also be added to the water in order to form a liquid solution at varying conditions.

The fuel cell system may include a PEM fuel cell stack rated at 25 W gross output (20 W net after BOP losses and hybrid battery charging) and the associated balance of plant (also referred to as "BOP"). The stack will be hybridized with an integrated lithium-polymer battery in order to ensure constant power output, to allow the system to handle high transient loads, and to facilitate initial system start-up. The fuel cell system will also contain the sheet metal backplane, interfaces to the fuel cell cartridge, and the fluid management subsystem needed to generate hydrogen.

In exemplary implementations, the fuel cell subsystem may contain a 5-cell PEM stack. With a 24-cell stack, the design can yield a rating of 180 W continuous gross output. The 5-cell PEM stack may be capable of 25 W gross output.

Figure 9:
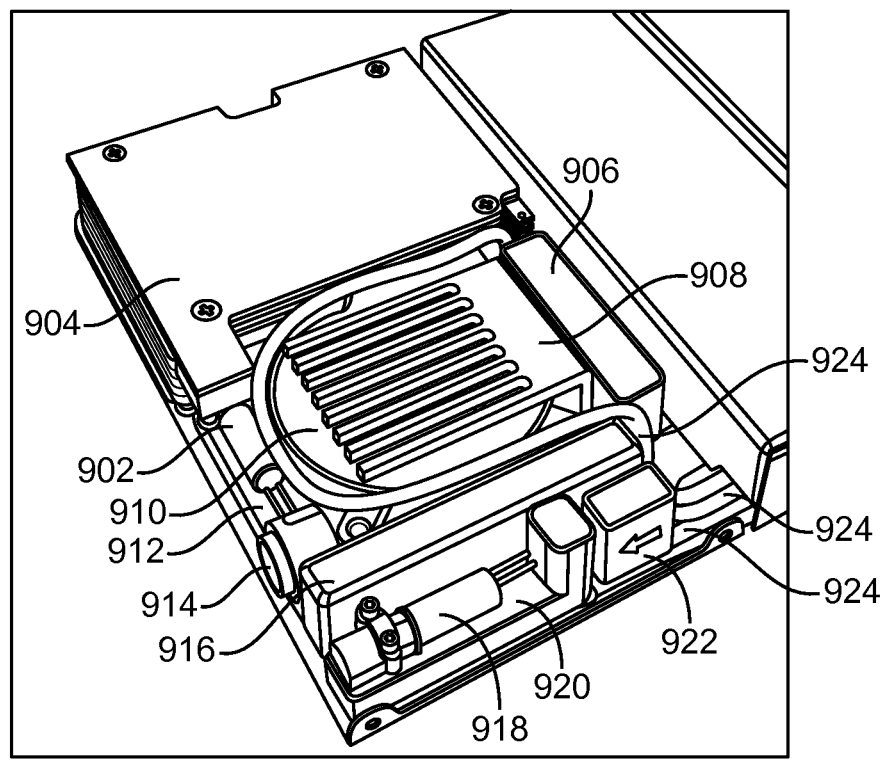
FIG. 9 illustrates aspects of the interior of the fuel cell system in an exemplary implementation of the present disclosure.

Exemplary implementations of fuel cell systems can further include various balance of plant components as shown in FIG. 9. A purge valve 902 can be connected to the far end of fuel cell stack 904 anode flow field. The fuel cell stack can be a 5 cell stack in some implementations. When purge valve 902 is opened, hydrogen flows quickly through the stack 904 and clears out accumulated moisture that is detrimental to stack operation. A stack air blower 910 can provide air for cooling and reacting with the catalyst in the fuel cell. A system controller PCB assembly 912 can be provided to monitor the fuel cell stack, operate the hydrogen generation subsystem, and operate the power electronics for management of internal battery charging, stack load handling and output switching/voltage set point. A heat sink 908 uses incoming stack air to cool the power electronics 906, which will dissipate waste heat during operation. A micropump 922 pulls water from the water bag and pushes it into the fuel selector valve block 920 with fuel selector valve 918. The fuel selector valve and valve block switches water delivery between the individual fuel modules. A hybrid Li-ion battery 916 provides full output capability while the stack and hydrogen generation subsystem are starting up and insulates the stack 904 from peak power demands. An output/comms connector 914 connects output power and SMBus communications to the electronic device being used. Fluid lines 924 deliver water from the water compartment to the micropump 922, water from the fuel selector valve block 920 to the fuel cartridges, and hydrogen from the fuel cartridge to the fuel cell stack 904. All fluid lines will route to the inside of the fuel cell subsystem and connect to the control valve, fuel selector valve 918 and fuel cell stack 904. There will be no active components outside of the fuel cell subsystem. The parasitic load for the fuel cell system BOP can have consumed power not exceeding an average of 5 W, resulting in 20 W net rated power. The storage battery 916 can supply additional power for short peaks and instant total power during the startup times.

The Array of Fuel Cell Cartridges

Figure 5:
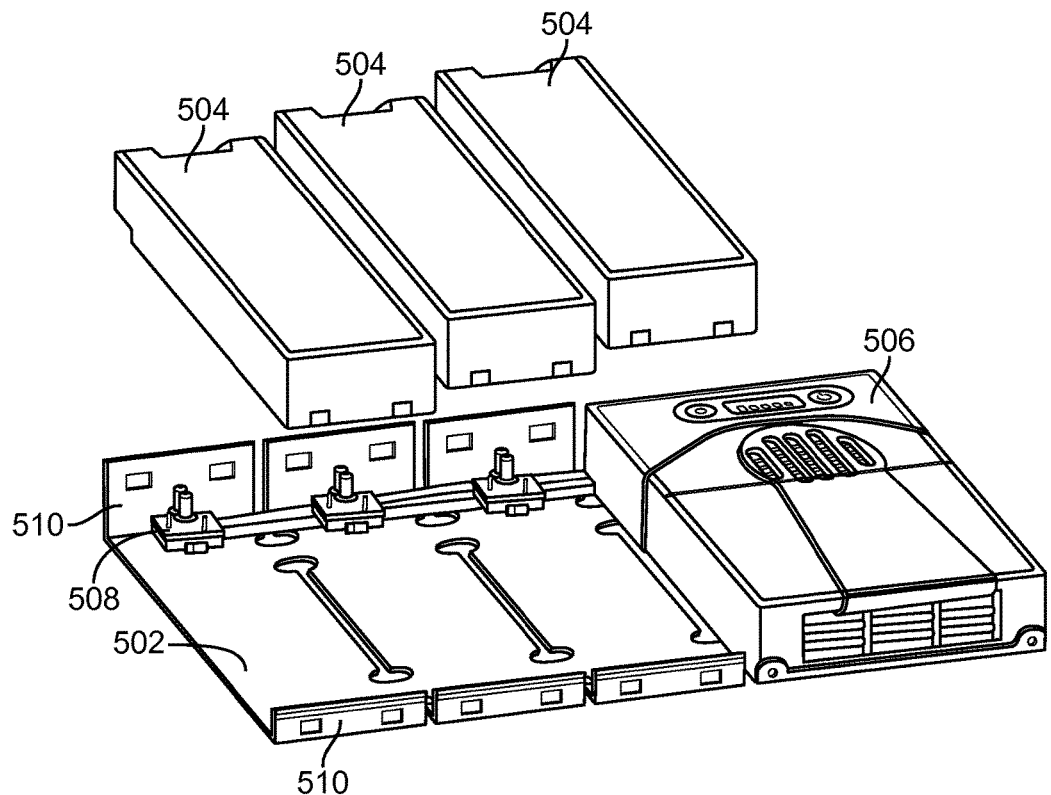
FIG. 5 illustrates aspects of a fuel cell power system in an exemplary implementation of the present disclosure.

In exemplary implementations, the fuel cell power systems can contain a plurality of fuel cell cartridges, each of which can be controlled independently. An exemplary implementation of a flexible fuel cell power system with three fuel cell cartridges 504, a fuel cell system 506, and a platform 502, is illustrated in FIG. 5. A semi-flexible backplane 502 is provided that can support the three fuel cell cartridges 504 and engage the cartridges at connection points 508 that can contain interface pins. The backbone material is also bent to provide the flanges 510 that support the fuel cell system and the fuel cell cartridges.

Figure 4:
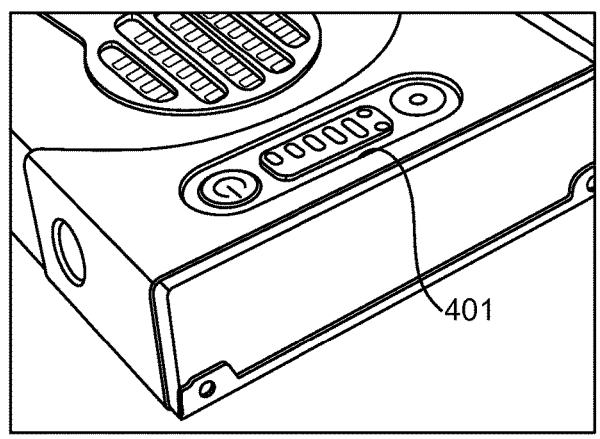
FIG. 4 illustrates aspects of a state-of-charge indicator of a fuel cell power system in an exemplary implementation of the present disclosure.

It has been discovered that a modular design with better hydrolysis performance efficiency and start/stop capability can be better achieved in a smaller sized cartridge to minimize the maximum distance between the water distribution network and any given particle of fuel. Each module within a fuel cell cartridge may contain a flexible bag of the silicide hybrid and a collapsible water bladder. As a fuel cartridge is depleted it can be quickly replaced with a new cartridge. Cartridges may be hot swappable, wherein a depleted cartridge may be replaced with a fresh cartridge while the remaining one or more operating cartridges continue to provide fuel to the fuel cell. The cartridge design may also allow for the rapid replacement of fuel modules within a cartridge. A state-of-charge display 401 as shown in FIG. 4 can allow users to see how much fuel remains at any given time.

The flexibility of the segmented fuel cartridge will be achieved through elastic deformation of flexible sheet metal members. Flexures and bendable support beams will be interwoven throughout the length of the fuel cartridge via the shared sheet metal backplane. This will allow the system to bend along one axis in a curvature that imitates the wearer's body.

The gaps between the segments at these flexible joints can be enclosed with a bellows-type joint which will provide additional structural support and prevent debris from entering the system. Each fuel module within a cartridge can be operated either in a sequence or simultaneously to facilitate control options, redundancy, and heat management optimization in both warm and low temperature conditions. In general, it is anticipated that the control strategy will be to operate each the fuel modules in a sequence in low temperature environments and in parallel in high temperature environments.

The water may be placed within a water bladder, which will be compressed against a fuel bag. In this form, the collapsible water bladder will deflate as the water is depleted; the displaced water volume will then be re-occupied by the newly-generated waste (example: sodium silicate) in the same allotted space. One commonly shared water-fill-port may be located on each fuel cartridge. This fill port can be used to fill all modules in a single action. Air-inlet vents can be added to the fuel cell power system enabling air circulation through the fuel cartridge for cooling.

Figure 7:
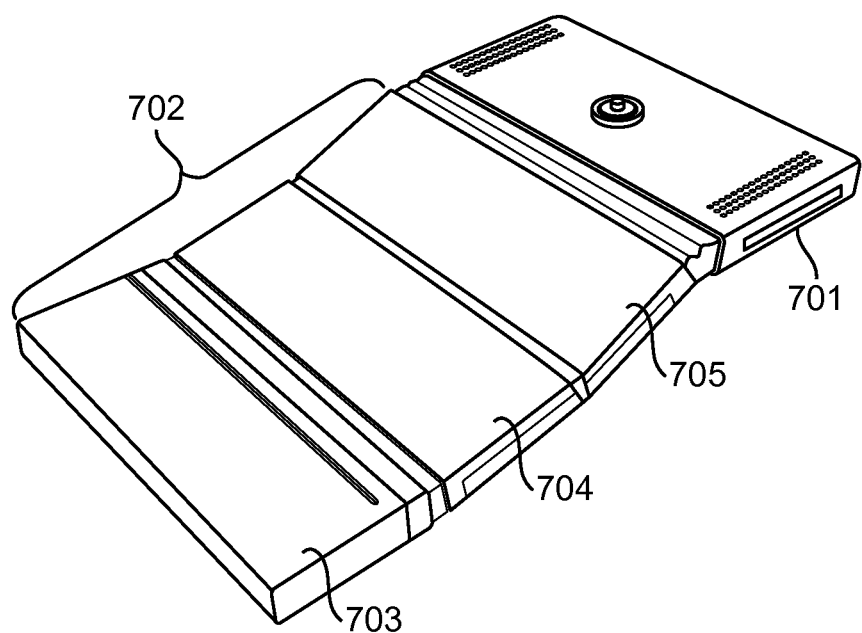
FIG. 7 illustrates aspects of a fuel cell power system in an exemplary implementation of the present disclosure.

The entire fuel cell cartridge may be covered in a flexible cartridge sheath. The outer casing may be constructed from a durable and thermally-resistant thick rubber, which will essentially mold itself to the wearer's body without any pre-fixed mechanical feature. Metal or plastic ribs can be incorporated for additional support. A simple conceptual diagram is shown in FIG. 7. In FIG. 7, a fuel cell system 701 and fuel cell cartridge 702, comprised of multiple modules 703, 704, and 705 are shown, with the cartridge covered in a flexible cartridge sheath.

Fuel Cell Power System

Figure 3:
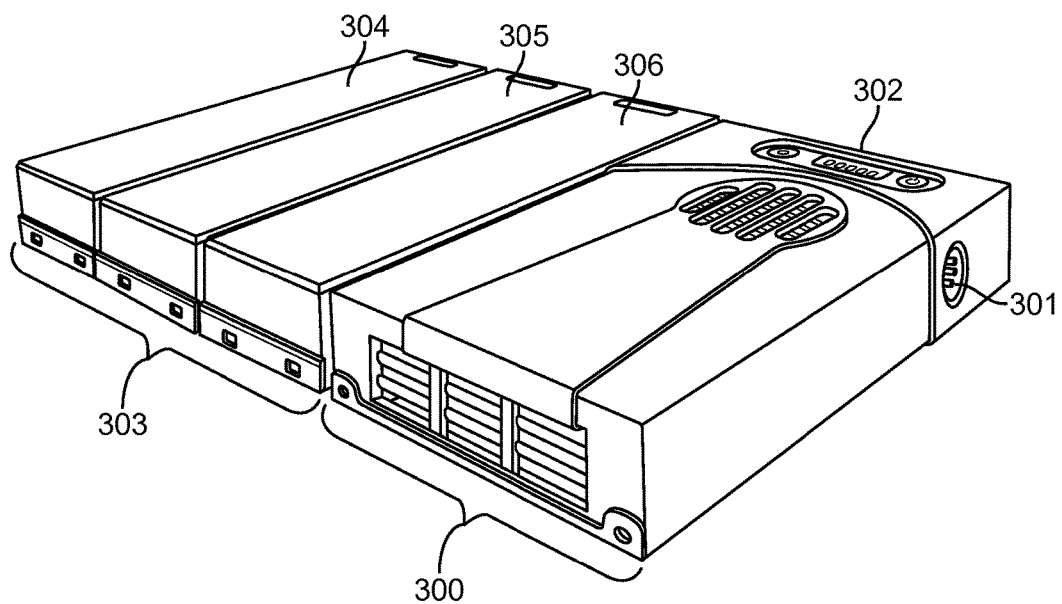
FIG. 3 illustrates aspects of a fuel cell power system in an exemplary implementation of the present disclosure.
Figure 6:
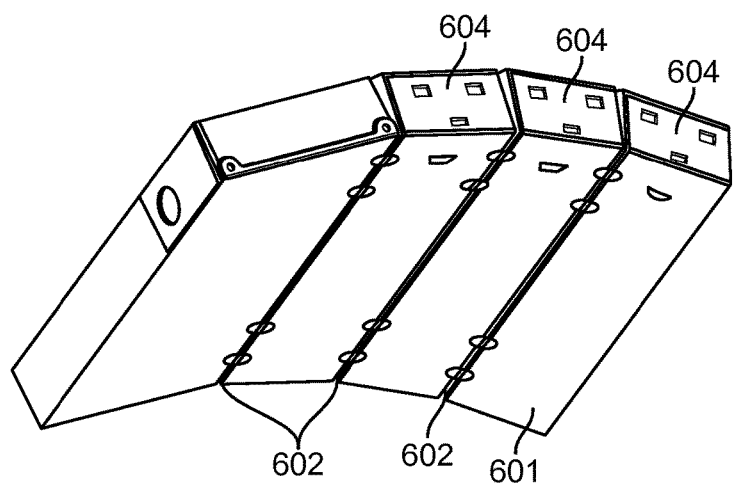
FIG. 6 illustrates aspects of a fuel cell power system in an exemplary implementation of the present disclosure.
Figure 8:
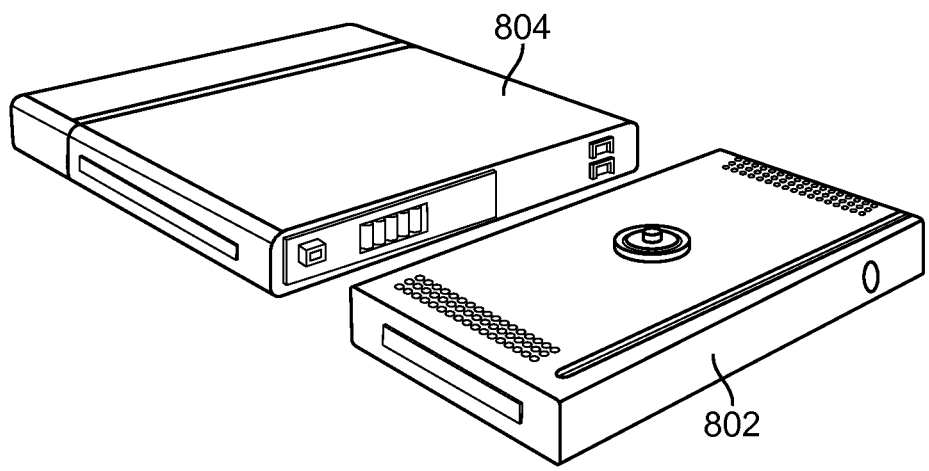
FIG. 8 illustrates aspects of a fuel cell power system in an exemplary implementation of the present disclosure.

The fuel cell power system comprises the segmented fuel cell cartridge connected to the fuel cell system. An implementation of a basic fuel cell power system is shown in FIG. 8. A fuel cell system 802 can be detachably connected to a fuel cartridge 804 which may be further comprised of multiple modules or may be a single module. In some implementations, the fuel cell power system, the connected combination of fuel cell system 802 and fuel cartridge 804, can have overall dimensions of approximately 6 inches by 0.7 inches by 9.45 inches.

Where there is a plurality of fuel cell modules making a cartridge, an exemplary implementation is shown in FIG. 3 and FIG. 6.

In FIG. 3, a segmented fuel cell cartridge 303 is shown with three fuel cell modules 304, 305, and 306. Modules may be hot swappable, wherein a depleted module may be replaced with a fresh module while the remaining one or more operating modules continue to provide fuel to the fuel cell. A fuel cell system 300 is shown with a state-of-charge indicator 302 and an electrical output port 301. FIG. 4 depicts a close-up view of an implementation of a state-of-charge indicator 401.

FIG. 6 shows an implementation of a flexible fuel cell power system, bending to a contoured shape. The integrated power system body including the fuel cell system and fuel cell cartridges 606, will be supported, for example on a 0.5 mm thick stainless steel backplane. As previously described, the backplane 601 is designed with flexures 602 between each module to permit the system to bend. These flexures can handle roughly 30 degrees of bending without permanent deformation. The backbone material is also bent to provide the flanges 604 that support the fuel cell system and the fuel cartridges. The top flanges can be designed to serve the function for quick and reliable latching and releasing the fuel cartridge. When a new fuel cartridge is fully installed, the interface pins will penetrate seals for the water input and hydrogen output ports on each fuel module. Each fuel cartridge can be capable of supplying enough hydrogen for a net fuel cell output of, for example, more than 83 W-hr, yielding a total of 250 W-hr with all three fuel modules in place.

The fuel cell power unit can include a data communications system that connects each module within the fuel cartridge to the fuel cell subsystem. This will allow data to be collected, stored and communicated to the user regarding the amount of hydrogen remaining in a cartridge, the number of restarts remaining, and specific module input valve control.

For small, very low-power systems, a pressurized valve source can be combined with an on-off control valve. With this type of configuration, a stacked system is developed with individual key components compressed upon one another. For example, a rigid lid may be used to compress a volume consisting of (from the bottom up) a fuel pouch, water pouch, then a layer of foam rubber. This assembly enables direct injection of water from the water pouch above into the fuel pouch below via a mechanical pressure differential applied by the compressed foam through a control valve. This passively operated planar system would be wholly self-sufficient, flexible, orientation independent (system is entirely compressed during operation), and realistically scalable for multiple applications. The compressed foam could also be easily replaced by an active water injection method (such as the proposed) to allot more space in the hydrogen generator cartridge itself.

While the passive method does eliminate the need for a mechanical pump, it affords less ability to control water, which becomes a more significant issue for a larger cartridge. A common water pump residing in the fuel cell system can be used for pumping water in the fuel cell cartridges, with each cartridge containing a controllable on/off valve. Alternatively, a miniature piezoelectric pump can also be used to deliver water into the fuel cell cartridges.

In an exemplary implementation, water can be pumped into the water-reactive powder via a water distribution network at pre-established flow rate that is directly proportional to the anticipated hydrogen generation rate required by the desired fuel cell current. A fuel selector valve can also be placed within the fuel cell module; this valve will be used to determine which fuel module to pump water to, enabling the system to operate the individual fuel modules either sequentially or simultaneously.

Figure 10:
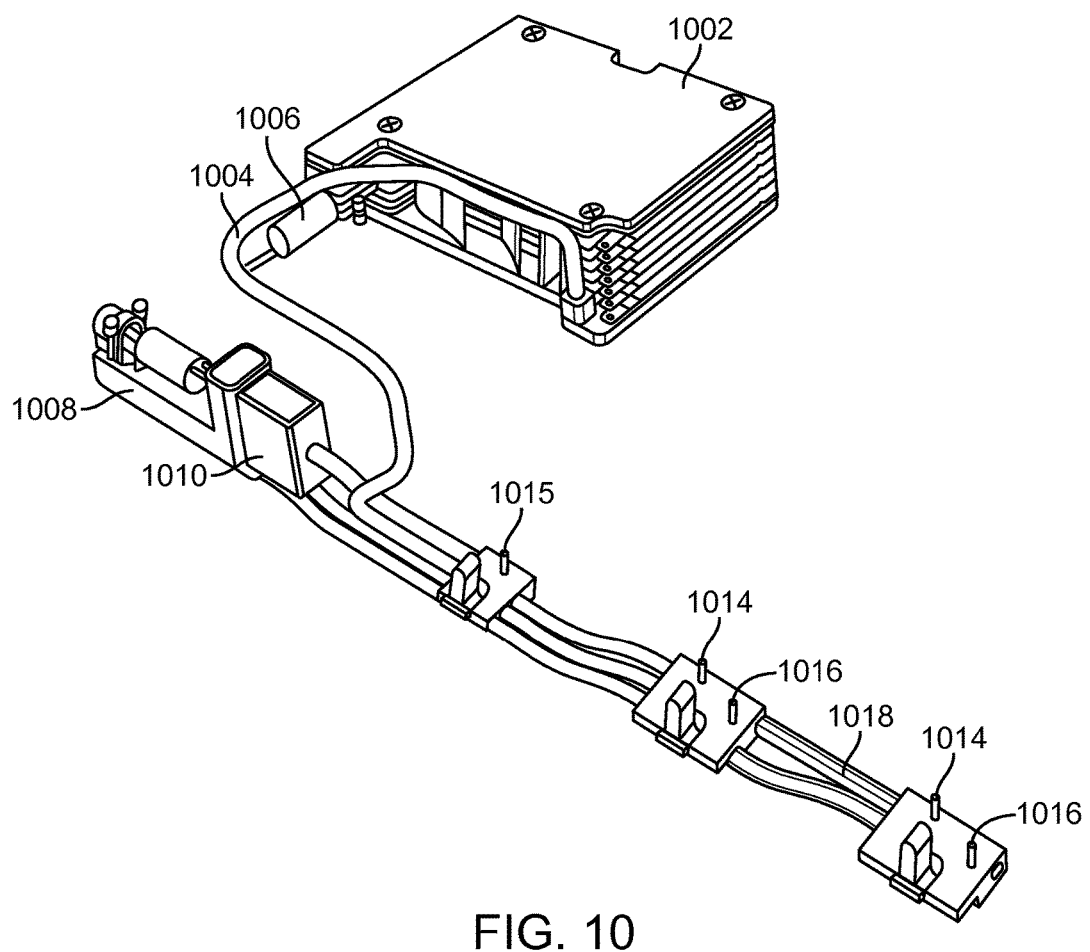
FIG. 10 illustrates aspects of the connections in a fuel cell power system in an exemplary implementation of the present disclosure.

FIG. 10 shows aspects of an exemplary implementation of a fuel cell power system. Fuel cell stack 1002 is connected to an H2 feed line 1004 and purge valve 1006. Also depicted are H2 out interfaces 1014, water in interfaces 1016, an H2 fail 1018 common to the interfaces with fuel cell cartridges (not shown), a fuel cartridge selector valve block 1008, micropump 1010, and water supply interface 1015.

As shown in FIG. 10, a single tube can connect all three water compartments to the water pump 1010, and three separate tubes can be used to connect the selector valve to the fuel compartment within each module. Water can be directed to flow to only one module at a time or to all modules simultaneously. The outward interfaces from each fuel module can connect to a common rail line that flows directly to the fuel cell stack. Check valves can be included in each module output interface to ensure that there is no back flow into unused fuel. To establish a design that fits achieves the energy density and lightweight, compact systems requirements, all connectors and tubes can be incorporated into the stainless steel backbone and travel down the length of the fuel cartridge body. The fuel and water interface components may feature alignment tabs that guarantee that each fuel module is properly aligned prior to the engagement of the interface needles.

When in use, a fuel cell cartridge snaps into place onto a locking tab located on the backbone. Each fuel cell cartridge then is punctured by the interface needles (as shown in FIG. 10) in a vertical motion. The fuel cell cartridge can also be easily detached in the reverse motion. Since the fuel cell cartridges are engaged in parallel instead of in series, removal of a depleted fuel module can be completed without interrupting the flow of power delivery in a hot swappable system.

Figure 12:
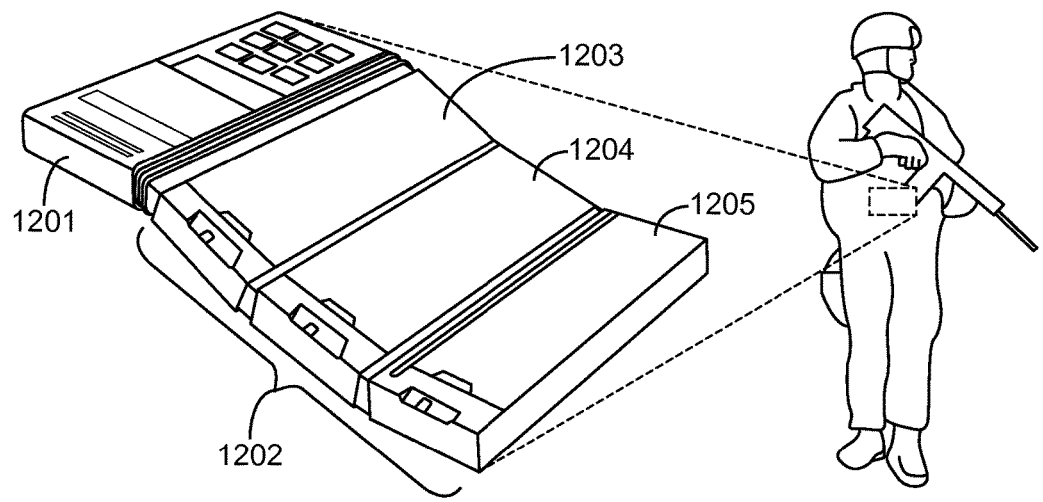
FIG. 12 illustrates aspects of a fuel cell power system in an exemplary implementation of the present disclosure.

FIG. 12 illustrates silicide-based fuel cell power system that provides soldiers with a reliable source of portable power in a lightweight, rugged and conformal format. A fuel cell system 1201 is connected to a fuel cartridge 1202. The cartridge 1202 is shown with multiple modules 1203, 1204, and 1205. The modules may be used in concert or individually. Different modules may be shut down or turned on depending on the energy needs of the system. The system may also be dynamic and a controller may turn on or off a particular module as needed. Modules may be hot swappable, wherein a depleted module may be replaced with a fresh module while the remaining one or more operating modules continue to provide fuel to the fuel cell. This system includes a solid hydrogen-storage technology to create fuel cell power systems that are non-flammable and non-explosive under stress, fire or ballistics. The fuel cell power systems are light in weight and thin. Yet, the fuel cell power systems generate enough power to potentially replace legacy battery technologies. The fuel cell power systems do not require battery recharging or new refueling infrastructures.

The fuel cell power systems of the present disclosure with all modules operating together can generate power up to 20 W, or up to 30 W. Preferably, the fuel cell power can generate power up to 35 W. More preferably, the fuel cell power can generate power up to 40 W.

The fuel cell power systems of the present disclosure can supply more than 8 hours of power, or more than 10 hours of power. More preferably, the fuel cell power systems will supply more than 12 hours of consistent power at 20 W for each 0.4 kg cartridge used.

The fuel cell power systems of the present disclosure can produce high energy density for the fuel cell/cartridge combined. For example, the fuel cell power systems can generate 387 W-hr/kg at 646 g for at least 12 hours of operation, or 531 W-hr/kg at 942 g for more than 24 hours of operation. Additionally, the energy density for additional cartridges can be 616 W-hr/kg at 406 g including all fuel and water elements, with a development path to reach 1,140 W-hr/kg in a 235 g cartridge.

The fuel cell power system of the present disclosure may weigh less than 1 kg, or less than 0.8 kg. Preferably, the fuel cell power system weighs less than 0.7 kg. More preferably, the fuel cell power system weighs less than 0.65 kg. The fuel cell power system is preferably lighter than a lithium battery power system. For example, in an exemplary implementation, the fuel cell power system is 942 g and 930 cc for a 24-hour mission, representing a 77% reduction by weight and 64% by volume from equivalent LI-145 batteries.

The fuel cell power system of the present disclosure offers a number of other advantages, including long shelf life since the fuel does not degrade over time and temperature.

Those of ordinary skill in the art will appreciate that a variety of materials can be used in the manufacturing of the components in the devices and systems disclosed herein. Any suitable structure and/or material can be used for the various features described herein, and a skilled artisan will be able to select an appropriate structures and materials based on various considerations, including the intended use of the systems disclosed herein, the intended arena within which they will be used, and the equipment and/or accessories with which they are intended to be used, among other considerations. Conventional polymeric, metal-polymer composites, metal-matrix composites, ceramics, and metal materials are suitable for use in the various components. Materials hereinafter discovered and/or developed that are determined to be suitable for use in the features and elements described herein would also be considered acceptable.

When ranges are used herein for physical properties, such as molecular weight, or chemical properties, such as chemical formulae, all combinations, and subcombinations of ranges for specific exemplar therein are intended to be included.

The disclosures of each patent, patent application, and publication cited or described in this document are hereby incorporated herein by reference, in its entirety.

Those of ordinary skill in the art will appreciate that numerous changes and modifications can be made to the exemplars of the disclosure and that such changes and modifications can be made without departing from the spirit of the disclosure. It is, therefore, intended that the appended claims cover all such equivalent variations as fall within the true spirit and scope of the disclosure.

The invention claimed is:

1. A flexible fuel cell power system comprising
a fuel cell cartridge comprising a plurality of fuel cell modules and a water compartment,
a fuel cell system, and
a platform,
wherein said fuel cell cartridge and said fuel cell system are attached to said platform, and
wherein said platform includes bendable joints or flexures which permit said platform to be flexible;
wherein the platform comprises a plurality of connection points configured to engage the plurality of fuel cell modules and water compartment via a plurality of interface pins;
wherein one of the plurality of connection points comprises a water supply interface connected with a tube to a water pump, with the water compartment connected to the water supply interface;
wherein two or more of the plurality of connection points each comprise an $H_2$-out interface pin and a water-in interface pin, with the plurality of fuel cell modules connected to the two or more connection points;
wherein each water-in interface pin is connected with a tube to a selector valve block configured to control and direct the flow of water to the plurality of fuel cell modules.

2. The flexible fuel cell power system of claim 1, further comprising a common rail line connected to the plurality of $H_2$-out interface pins and configured to feed $H_2$ to the fuel cell system.

3. The flexible fuel cell power system of claim 1, wherein said fuel cell cartridge or said plurality of fuel cell modules are removably attached to said platform.

4. The flexible fuel cell power system of claim 1, wherein one or more of said platform, said fuel cell cartridge, said plurality of fuel cell modules, and said fuel cell system are constructed from flexible material.

5. The flexible fuel cell power system of claim 4, wherein said flexible material comprises polyethylene terephthalate.

6. The flexible fuel cell power system of claim 1, wherein said plurality of fuel cell modules form a flexible fuel cartridge array connected by hinged or elastic joints.

7. The flexible fuel cell power system of claim 1, wherein said fuel cell cartridge comprises reactant fuel material that is NaSi or NaSi/NaBH$_4$ mixture.

8. The flexible fuel cell power system of claim 1, wherein each of the fuel cell modules comprises a collapsible water bladder.

9. The flexible fuel cell power system of claim 1, wherein said fuel cell cartridge further comprises a filtration element.

10. The flexible fuel cell power system of claim 1, wherein said fuel cell system further comprises one or more of the following: a purge valve, a stack air blower, a system controller PCB assembly, a heat sink, a fuel selector, a hybrid Li-ion battery, an output/comms connector, and one or more fluid lines.

11. The flexible fuel cell power system of claim 1, wherein the system is capable of generating power up to 20 W.

12. The flexible fuel cell power system of claim 1, wherein the system is capable of supplying more than 8 hours of power.

13. The flexible fuel cell power system of claim 1, wherein the system weighs less than 1 kg.

14. The flexible fuel cell power system of claim 1, wherein the system is capable of generating power up to 30 W.

15. The flexible fuel cell power system of claim 1, wherein the system is capable of generating power up to 40 W.

16. The flexible fuel cell power system of claim 1, wherein the system is capable of supplying more than 10 hours of power.

17. The flexible fuel cell power system of claim 1, wherein the system is capable of supplying more than 12 hours of power.

18. The flexible fuel cell power system of claim 1, wherein the system is capable of supplying between 8-12 hours of power.

19. The flexible fuel cell power system of claim 1, wherein the system weighs less than 0.8 kg.

20. The flexible fuel cell power system of claim 1, wherein the system weighs less than 0.7 kg.

* * * * *